(12) United States Patent
Tanabe et al.

(10) Patent No.: US 9,693,309 B2
(45) Date of Patent: Jun. 27, 2017

(54) MOBILE ELECTRONIC DEVICE

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/891,668

(22) PCT Filed: May 13, 2014

(86) PCT No.: PCT/JP2014/062749
§ 371 (c)(1),
(2) Date: Nov. 16, 2015

(87) PCT Pub. No.: WO2014/185427
PCT Pub. Date: Nov. 20, 2014

(65) Prior Publication Data
US 2016/0081030 A1    Mar. 17, 2016

(30) Foreign Application Priority Data
May 17, 2013  (JP) ................................. 2013-105443

(51) Int. Cl.
*H04W 52/02* (2009.01)
(52) U.S. Cl.
CPC ..... *H04W 52/0254* (2013.01); *H04W 52/028* (2013.01); *H04M 2250/12* (2013.01)

(58) Field of Classification Search
CPC ..................... H04W 52/0254; H04W 52/0251
(Continued)

(56) References Cited

U.S. PATENT DOCUMENTS

2008/0146218 A1* 6/2008 Shimomura ...... H04W 36/0088
455/425
2010/0026566 A1* 2/2010 Ueda ....................... G01S 19/42
342/357.36
(Continued)

FOREIGN PATENT DOCUMENTS

JP    2004-297121 A    10/2004
JP    2007-274074 A    10/2007
(Continued)

OTHER PUBLICATIONS

International Search Report mailed Jul. 8, 2014, corresponding to International application No. PCT/JP2014/062749.
(Continued)

*Primary Examiner* — John J Lee
(74) *Attorney, Agent, or Firm* — Hauptman Ham, LLP

(57) ABSTRACT

A mobile electronic device includes an acceleration sensor configured to detect acceleration value, a communication processing unit configured to perform communication, and a controller configured to determine a moving state and a stopped state based on the acceleration value detected by the acceleration sensor, wherein the controller is configured to cause a communication function of the communication processing unit to turn on when the mobile electronic device changes from the moving state to the stopped state and then does not change from the stopped state from the moving state again for a predetermined period of time.

5 Claims, 3 Drawing Sheets

(58) Field of Classification Search
USPC .................. 455/550.1, 67.11, 552.1, 90.2
See application file for complete search history.

(56) References Cited

U.S. PATENT DOCUMENTS

| | | |
|---|---|---|
| 2011/0207405 A1 | 8/2011 | Minemura et al. |
| 2012/0033653 A1 | 2/2012 | Kalbag |
| 2012/0176236 A1* | 7/2012 | Kao .................. G06Q 10/10 340/502 |
| 2013/0006529 A1* | 1/2013 | Miyamoto .......... G01C 21/365 701/516 |
| 2013/0325392 A1* | 12/2013 | Takahashi ......... H04M 1/72563 702/141 |

FOREIGN PATENT DOCUMENTS

| | | |
|---|---|---|
| JP | 2009-44309 A | 2/2009 |
| JP | 2009-303234 A | 12/2009 |

OTHER PUBLICATIONS

Extended European Search Report in EP Application No. 14798479.3, dated Nov. 25, 2016.

* cited by examiner

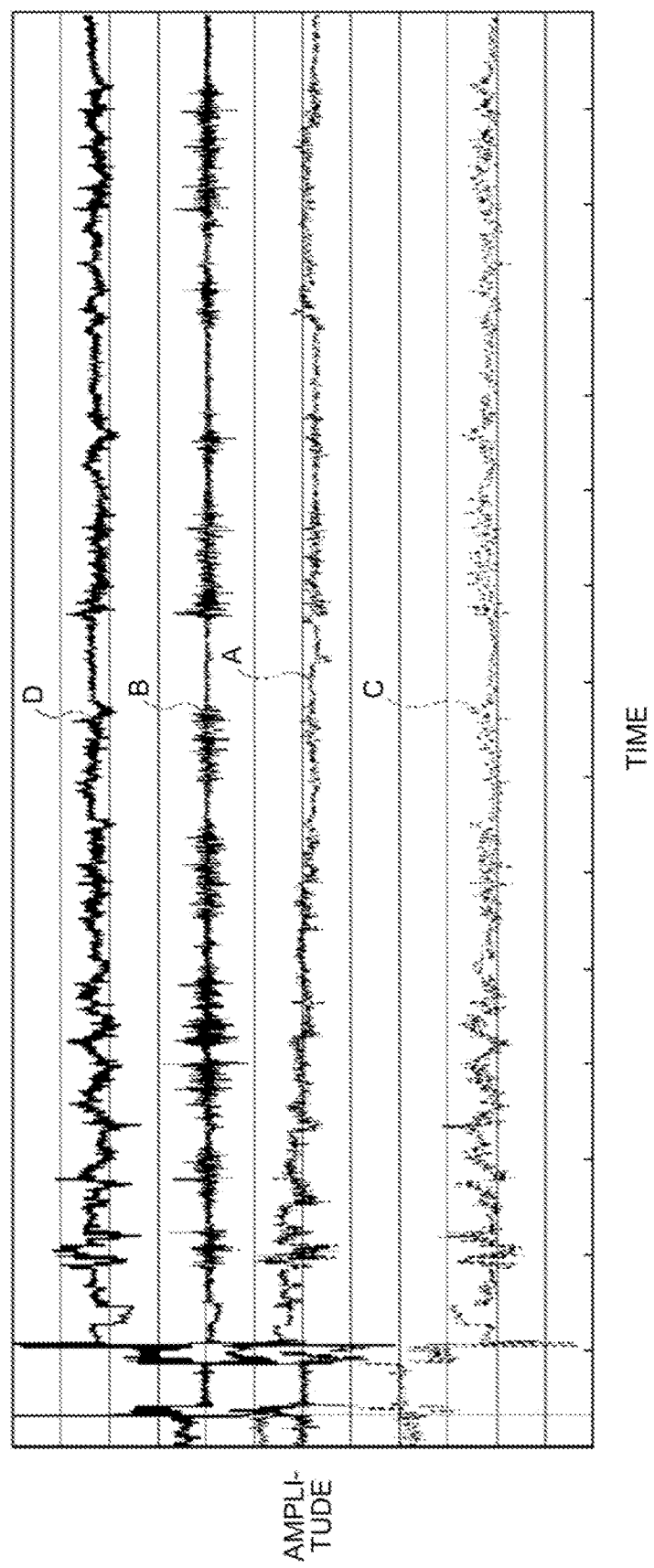

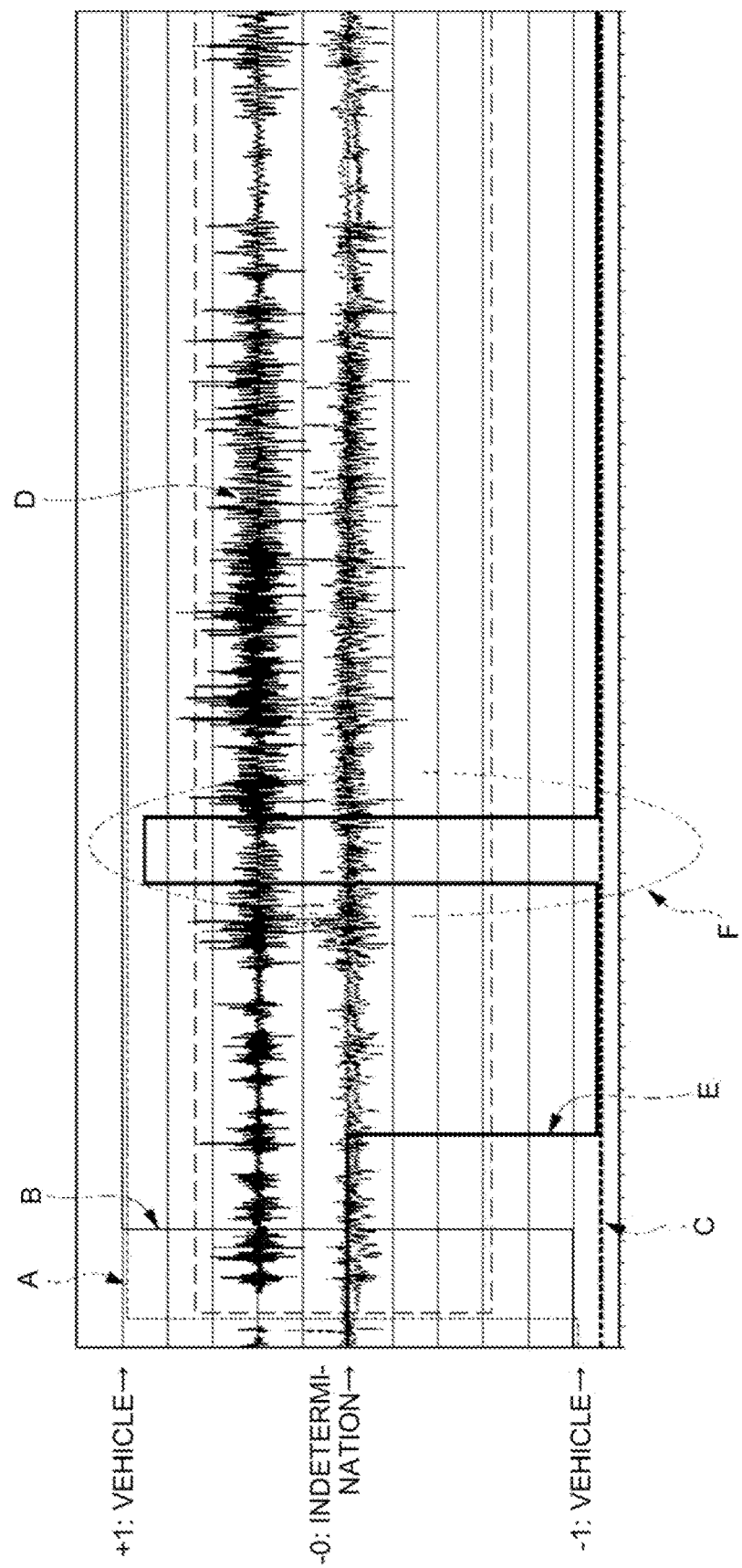

MOBILE ELECTRONIC DEVICE

CROSS-REFERENCE TO RELATED APPLICATION

This application is a National Stage of PCT international application Ser. No. PCT/JP2014/062749 filed on May 13, 2014 which designates the United States, incorporated herein by reference, and which is based upon and claims the benefit of priority from Japanese Patent Application No. 2013-105443 filed on May 17, 2013, the entire contents of which are incorporated herein by reference.

FIELD

The present disclosure relates to a mobile electronic device which can perform communication.

BACKGROUND

There is a mobile electronic device to perform communication by a plurality of communication methods (see, for example, Japanese Patent Application Laid-open No. 2009-303234).

SUMMARY

A mobile electronic device according to an aspect comprises: an acceleration sensor configured to detect acceleration value; a communication processing unit configured to perform communication; and a controller configured to determine a moving state and a stopped state based on the acceleration value detected by the acceleration sensor, wherein the controller is configured to cause a communication function of the communication processing unit to turn on when the mobile electronic device changes from the moving state to the stopped state and then does not change from the stopped state from the moving state again for a predetermined period of time.

A mobile electronic device according to an aspect comprises: an acceleration sensor configured to detect acceleration value; a communication processing unit configured to perform communication; and a controller configured to determine a riding state and a stopped state based on the acceleration value detected by the acceleration sensor, wherein the controller is configured to cause a communication function of the communication processing unit to turn on when the riding state becomes the stopped state.

BRIEF DESCRIPTION OF DRAWINGS

FIG. 2 is a view schematically illustrating a detection result by an acceleration sensor according to an embodiment.

FIG. 3 is a view for describing a determination of each state based on a detection result by an acceleration sensor according to an embodiment.

DESCRIPTION OF EMBODIMENTS

Figure 1:
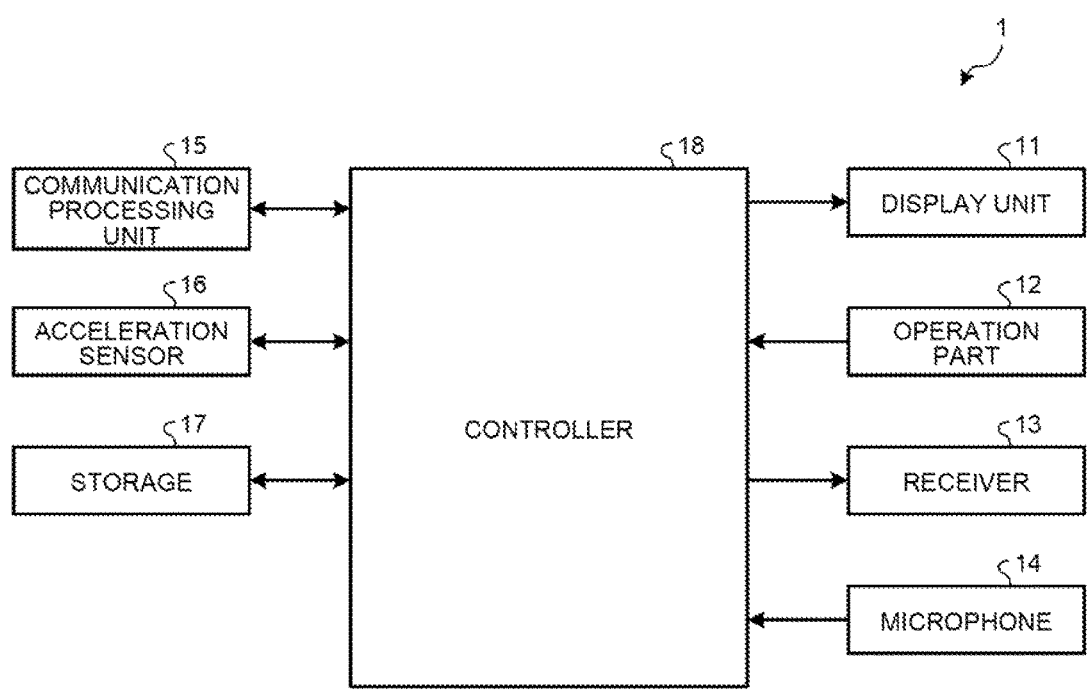
FIG. 1 is a block diagram illustrating a configuration of a mobile phone according to an embodiment.

An embodiment to implement the present disclosure will be described in detail with reference to the drawings. In the following, a mobile phone 1 will be described as an example of a mobile electronic device.

As illustrated in FIG. 1, the mobile phone 1 includes a display unit 11, an operation part 12, a receiver 13, a microphone 14, a communication processing unit 15, an acceleration sensor 16, storage 17, and a controller 18.

The display unit 11 includes a display device such as a liquid crystal display or an organic electro-luminescence panel. On the display unit 11, a character, an image, a sign, a figure, or the like is displayed.

The operation part 12 includes a plurality of buttons and is operated by a user. It should be noted that the operation part 12 may include a single button.

The receiver 13 converts a sound signal transmitted from the controller 18 into sound and outputs the sound.

The communication processing unit 15 includes an antenna and an RF circuit. The communication processing unit 15 performs communication by a plurality of communication methods respectively corresponding to a plurality of wireless communication standards. The communication processing unit 15 can perform communication by a communication standard of a cellular phone such as 2G, 3G, or 4G or by a wireless LAN system. The communication processing unit 15 can perform communication by a wireless communication system, which is a wireless LAN system and which is compliant with IEEE 802.11, such as a wireless communication system of Wi-Fi (registered trademark). The communication processing unit 15 may perform communication by a wireless communication system such as Bluetooth (registered trademark) or WiMAX (registered trademark). A plurality of antennas and RF circuits is provided in such a manner as to respectively correspond to a plurality of communication methods. In the present disclosure, a description will be made on the assumption that the communication processing unit 15 performs communication by Wi-Fi. Since having a smaller communication area compared to a wireless communication system in a communication standard of a cellular phone, Wi-Fi is used better in a stopped state than in a moving state.

The acceleration sensor 16 detects a direction and a size of acceleration on the mobile phone 1 and outputs a detection result to the controller 18. The acceleration sensor 16 is a 3G (three-dimensional) type which detects acceleration value in an X-axis direction, a Y-axis direction, and a Z-axis direction.

It is assumed that the acceleration sensor 16 is configured as a piezoresistance-type, a capacitance-type, or the like. However, the embodiments are not limited thereto. For example, the acceleration sensor 16 may be configured as a piezoelectric element (piezoelectric-type), a type of micro electro mechanical systems (MEMS) by a heat detection-type, a servo-type to move a moving coil and to perform restoring by a feedback current, a strain gauge-type to measure strain generated by acceleration with a strain gauge, or the like.

The storage 17 is used, for example, for calculation processing performed by the memory controller 18 and includes a memory or the like. The storage 17 stores one or more applications which operate in an inner part of the mobile phone 1. The storage 17 may also functions as a removable external memory.

The controller 18 controls the whole mobile phone 1 and is configured by using a central processing unit (CPU) or the like. When a state does not become a moving state within a predetermined period of time after a walking state becomes a stopped state, the controller 18 turns on a communication function of the communication processing unit 15.

Processing of a detection result from the acceleration sensor 16 which processing is performed by the controller 18 will be described.

As illustrated in FIG. 2, acceleration value in the X-axis direction (A in FIG. 2), acceleration value in the Y-axis direction (B in FIG. 2), acceleration value in the Z-axis direction (C in FIG. 2), and a vector value which is resultant acceleration value (D in FIG. 2) are transmitted to the controller 18 as a detection result from the acceleration sensor 16. The controller 18 performs logging of the resultant vector value, analyzes the logged data, and determines a state of the mobile phone 1. The logged data is stored into the storage 17.

When the controller 18 determines a state of the mobile phone 1, acceleration patterns which are respectively associated with a stopped state and a plurality of moving states and which are previously stored in the storage 17 are used, for example. Each of the acceleration patterns is a pattern which is previously measured and extracted, the pattern indicating what kind of acceleration pattern is characteristically detected by the acceleration sensor 16, for example, when the mobile phone 1 is in a stopped state or when a user holding the mobile phone 1 is in a state of walking or in a state of riding a bike. In the present disclosure, for example, an acceleration pattern corresponding to the logged data of the resultant vector value in the stopped state or each of the plurality of moving states is previously stored in the storage 17. The controller 18 determines a state of the mobile phone 1 by comparing the logged data of the resultant vector value with the acceleration pattern.

The mobile phone 1 according to the present disclosure has a configuration to turn on a communication function suitably by determining a state of the mobile phone 1. In the following, the configuration to turn on the communication function suitably will be described.

The controller 18 determines a walking state and a stopped state based on acceleration value detected by the acceleration sensor 16. When a state does not become a moving state within a predetermined period of time after a walking state becomes a stopped state, the controller 18 turns on a communication function of the communication processing unit 15.

More specifically, the controller 18 determines whether the mobile phone 1 is in the moving state or the stopped state based on the acceleration value detected by the acceleration sensor 16.

For example, the controller 18 determines which of the stopped state and first to fifth moving states described later a state is. For example, the stopped state is a state in which the mobile phone 1 is placed. The controller 18 determines that a state is the stopped state when acceleration value is not detected by the acceleration sensor 16 or when there is little acceleration. The controller 18 can determine that a state is the stopped state when it is determined that acceleration value detected by the acceleration sensor 16 is not in any of the first to fifth moving states described later.

The controller 18 can determine whether a state is a state of riding a bike, a car, or a train or a walking state by determining which of the first to fifth moving states described later the state is.

The first moving state is a state in which a user of the mobile phone 1 is not riding a vehicle. That is, the first moving state is a walking state. The second moving state is a state in which the user is riding a car. The third moving state is a state in which the user is riding a bike. The fourth moving state is a state in which the user is riding a train. The fifth moving state is a state in which the user is riding the other moving means.

First of all, it is assumed that a communication function of the communication processing unit 15 is off. When a state does not become a moving state within a predetermined period of time after a moving state (walking state) becomes a stopped state, the controller 18 turns on the communication function of the communication processing unit 15. By turning on the communication function of the communication processing unit 15, the controller 18 searches for a base station (access point) corresponding to Wi-Fi. When a base station corresponding to Wi-Fi is found, the controller 18 tries to establish communication connection with the base station. It is assumed that the controller 18 repeatedly searches for a base station until communication connection is established. However, the embodiments are not limited thereto. For example, when it is not possible to find a base station corresponding to Wi-Fi within a predetermined period of time (such as one minute), the controller 18 may stop searching for a base station. The controller 18 does not turn on the communication function of the communication processing unit 15 when a state becomes a moving state within a predetermined period of time after a moving state (walking state) becomes a stopped state. In this case, the controller 18 keeps the communication function of the communication processing unit 15 being off.

In such a manner, when a state does not become a moving state within a predetermined period of time after a state becomes a stopped state in which data communication is easily performed (state preferable to Wi-Fi), the mobile phone 1 turns on the communication function of the communication processing unit 15 and searches for a base station corresponding to Wi-Fi. Since the mobile phone 1 searches for a base station of Wi-Fi and tries to establish communication connection in a state in which data communication is performed easily, it is possible to increase user-friendliness and to control power consumption compared to a case of keeping the communication function of the communication processing unit 15 being on and constantly performing a search. Then, the mobile phone 1 prevents the communication function of the communication processing unit 15 from being turned on when a user walks on a road and stops temporarily, for example, due to a traffic light. Thus, it is possible to control power consumption.

It is assumed that the controller 18 turns on the communication function of the communication processing unit 15 when a state of the mobile phone 1 does not become a moving state again for a predetermined period of time after the state becomes a stopped state from the moving state (walking state). However, the moving state (walking state) is not limited to a walking state and may be a different moving state. In a case of a different moving state, control may be changed in the following manner.

When a state of the mobile phone 1 changes from a riding state to a stopped state, the controller 18 may turn on the communication function of the communication processing unit 15. The riding state is one of the second moving state, the third moving state, the fourth moving state, and the fifth moving state. In this case, the controller 18 turns on the communication function of the communication processing unit 15 before a predetermined period passes after a state of the mobile phone 1 changes from the riding state to the stopped state.

It is because it takes more time when the controller 18 determines whether the riding state (one of second moving state, third moving state, fourth moving state, and fifth moving state) becomes the stopped state based on acceleration value detected by the acceleration sensor 16 compared to a case of determining whether the state changes from the walking state to the stopped state.

In order to appropriately determine that a state changes from the riding state into the stopped state, it is necessary to consider that movement and stop are performed repeatedly during riding and it takes longer time to make a determination.

In the above, an embodiment of the present disclosure has been described. However, the present disclosure is not limited to the above-described disclosure. An effect described in an embodiment of the present disclosure is just a description of the most preferable effect generated by the present disclosure and an effect of the present disclosure is not limited to what has been described in an embodiment.

In an above embodiment, it is determined which of the stopped state and the plurality of moving states a state of the mobile phone 1 is based on acceleration value detected by the acceleration sensor 16. However, the embodiments are not limited thereto. For example, the mobile phone 1 may measure a position of the mobile phone 1 by using a global positioning system (GPS) and may determine which of a stopped state and a plurality of moving states the mobile phone 1 is in according to an amount of displacement of the mobile phone 1 in a unit time (predetermined period of time).

The invention claimed is:

1. A mobile electronic device, comprising:
an acceleration sensor configured to detect an acceleration value;
a communication processing unit configured to perform wireless communication with an external device; and
a controller configured to determine a moving state and a stopped state based on the acceleration value detected by the acceleration sensor,
wherein the controller is configured to control the communication processing unit to perform the wireless communication with the external device in order to search for a base station when the mobile electronic device changes from the moving state to the stopped state and then does not change from the stopped state to the moving state again for a predetermined period of time.

2. The mobile electronic device of claim 1, wherein
the controller is configured to prevent the communication processing unit from searching for a base station when the mobile electronic device is in the moving state, and the controller is configured to prevent the communication processing unit from searching for a base station when the mobile electronic device changes from the moving state to the stopped state and then changes from the stopped state to the moving state again before the predetermined period of time expires.

3. A mobile electronic device, comprising:
an acceleration sensor configured to detect an acceleration value;
a communication processing unit configured to perform wireless communication with an external device; and
a controller configured to determine a riding state and a stopped state based on the acceleration value detected by the acceleration sensor,
wherein the controller is configured to control the communication processing unit to perform the wireless communication with the external device in order to search for a base station when the riding state becomes the stopped state.

4. A mobile electronic device, comprising:
a global positioning system configured to measure a position of the mobile electronic device;
a communication processing unit configured to perform wireless communication with an external device; and
a controller configured to determine a moving state and a stopped state based on the position measured by the global positioning system,
wherein the controller is configured to control the communication processing unit to perform the wireless communication with the external device in order to search for a base station when the mobile electronic device changes from the moving state to the stopped state and then stays in the stopped state for a predetermined period of time.

5. A mobile electronic device, comprising:
a communication processing unit configured to perform wireless communication with an external device; and
a controller configured to determine a riding state and a stopped state of a user that operates the mobile electronic device,
wherein the controller is configured to control the communication processing unit to perform the wireless communication with the external device in order to search for a base station when the riding state becomes the stopped state.

* * * * *